(12) United States Patent
Kobayashi et al.

(10) Patent No.: US 9,484,603 B2
(45) Date of Patent: Nov. 1, 2016

(54) SEALED LITHIUM SECONDARY BATTERY AND METHOD OF MANUFACTURING SAME

(75) Inventors: Kiwamu Kobayashi, Seto (JP); Naoki Wakamatsu, Okazaki (JP); Hideki Sano, Okazaki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 141 days.

(21) Appl. No.: 14/355,857

(22) PCT Filed: Nov. 4, 2011

(86) PCT No.: PCT/JP2011/075480
§ 371 (c)(1),
(2), (4) Date: May 2, 2014

(87) PCT Pub. No.: WO2013/065187
PCT Pub. Date: May 10, 2013

(65) Prior Publication Data
US 2014/0315072 A1    Oct. 23, 2014

(51) Int. Cl.
| | |
|---|---|
| *H01M 10/44* | (2006.01) |
| *H01M 2/02* | (2006.01) |
| *H01M 2/08* | (2006.01) |
| *H01M 10/0525* | (2010.01) |
| *H01M 10/0565* | (2010.01) |
| *H01M 10/0587* | (2010.01) |
| *H01M 10/052* | (2010.01) |

(52) U.S. Cl.
CPC ......... *H01M 10/446* (2013.01); *H01M 2/0217* (2013.01); *H01M 2/08* (2013.01); *H01M 10/052* (2013.01); *H01M 10/0525* (2013.01); *H01M 10/0565* (2013.01); *H01M 10/0587* (2013.01); *Y02E 60/122* (2013.01); *Y02P 70/54* (2015.11); *Y02T 10/7011* (2013.01); *Y10T 29/4911* (2015.01)

(58) Field of Classification Search
CPC .. H01M 10/446; H01M 2/0217; H01M 2/08; H01M 10/0525; H01M 10/0565; H01M 10/0587; H01M 10/052
See application file for complete search history.

(56) References Cited

FOREIGN PATENT DOCUMENTS

| JP | 11102729 A | 4/1999 |
|---|---|---|
| JP | 2000-90974 | 3/2000 |
| JP | 2004-30957 | 1/2004 |
| JP | 2008-27741 | 2/2008 |
| JP | 2008-243718 | 10/2008 |
| JP | 2010-80105 | 4/2010 |

*Primary Examiner* — Helen O Conley
(74) *Attorney, Agent, or Firm* — Finnegan, Henderson, Farabow, Garrett & Dunner, LLP (57) ABSTRACT

The invention provides a method capable of more simply and easily mass-producing sealed lithium secondary batteries having a stable battery performance. This method of manufacturing a sealed lithium secondary battery having an electrode assembly, an electrolyte solution and a sealable metallic or nonmetallic hard case of a given shape includes the steps of housing the electrode assembly, which includes a positive electrode and a negative electrode, and the electrolyte solution within the hard case; negatively pressurizing the interior of the hard case and sealing the hard case in the negatively pressurized state; carrying out, after the sealing step, initial charging so as to adjust the battery to a voltage at which the electrode assembly generates gases; and carrying out, after the initial charging step, main charging so as to charge the battery to a predetermined voltage. During the interval following the sealing step and up until the main charging step, the hard case is maintained in a sealed state so that the interior of the hard case is not open to the atmosphere.

11 Claims, 8 Drawing Sheets

SEALED LITHIUM SECONDARY BATTERY AND METHOD OF MANUFACTURING SAME

CROSS-REFERENCE TO RELATED APPLICATIONS

This application is a national phase application of International Application No. PCT/JP2011/075480, filed Nov. 4, 2011, the content of which is incorporated herein by reference.

TECHNICAL FIELD

The present invention relates to a method of manufacturing a sealed lithium secondary battery. More specifically, the present invention relates to a method of manufacturing such batteries having a stable battery performance.

BACKGROUND ART

Compared with other existing batteries, lithium ion batteries and other lithium secondary batteries are small and lightweight, and are endowed with a high energy density and an excellent power density. As a result, in recent years, such batteries have been advantageously used as portable power sources for personal computers and handheld electronic devices, and as power sources for driving vehicles.

One implementation of this battery is the sealed lithium secondary battery. This battery is typically fabricated by introducing an electrode assembly made up of a positive electrode and a negative electrode, together with an electrolyte (typically an electrolyte solution), into a battery case, then attaching a lid to the case and closing (sealing) the case in a very low humidity environment (referred to below as a "dry environment"). The electrodes (the positive electrode and the negative electrode) are each formed of an electrode mixture layer (positive electrode mixture layer and negative electrode mixture layer) composed primarily of an active material which can reversibly intercalate and deintercalate the charge carriers (lithium ions) on the corresponding positive or negative current collector.

However, in a sealed lithium secondary battery, the trace amount of moisture present in these battery components and a portion of the electrolyte ingredients (nonaqueous solvent, supporting salt, etc.) are decomposed at the electrode surfaces during initial charging, resulting in the generation of gases. The generation of such gases causes the internal pressure of the battery to rise. Related art that addresses this problem is described in Patent Literature 1 to Patent Literature 3. For example, Patent Literature 1 discloses art in which the battery is initially charged before the battery case is sealed, the gases generated with charging are discharged outside of the battery case, and then the case is sealed, Patent Literature 2 discloses a method which includes the steps of first pre-sealing the battery case in a dry environment, then initially charging the battery in open air, and subsequently discharging the generated gases and carrying out a main sealing operation in, once again, a dry environment.

CITATION LIST

Patent Literature

Patent Literature 1: JP 2000-090974 A
Patent Literature 2: JP 2008-27741 A
Patent Literature 3: JP 2008-243718 A

SUMMARY OF INVENTION

However, in the manufacturing method described in Patent Literature 1, because it is necessary to carrying out charging treatment before sealing the battery case, a dry environment is required for an extended period of time during such charging treatment. In a dry environment, the humidity must be constantly held to a very low level, which entails high equipment and upkeep expenses, and moreover necessitates the maintenance of humidity sensors and the like. Therefore, from the standpoint of such considerations as productivity and investments on plant and equipment, it is preferable to limit as much as possible the operations done in such an environment. In the manufacturing method described in Patent Literature 2, because charging treatment is carried out after pre-sealing, such charging treatment can be carried out in open air. However, because multiple sealing steps are required, the operations are complicated and thus likely to result in a higher rate of defective product.

It is therefore an object of the invention to provide a method capable of more simply and easily mass-producing sealed lithium secondary batteries having a stable battery performance.

In order to achieve the above object, this invention discloses a method of manufacturing a sealed lithium secondary battery having an electrolyte assembly, an electrolyte solution, and a sealable metallic or nonmetallic hard case of a given shape. The manufacturing method of the invention includes the steps of housing the electrode assembly, which includes a positive electrode and a negative electrode, and the electrolyte solution within the hard case; negatively pressurizing the interior of the hard case and sealing the hard case in the negatively pressurized state; carrying out, after the sealing step, initial charging so as to adjust the battery to a voltage at which the electrode assembly generates gases; and carrying out, after the initial charging step, main charging so as to charge the battery to a predetermined voltage. The manufacturing is characterized in that, during the interval following the sealing step and up until the main charging step, the hard case is maintained in a sealed state so that the interior of the hard case is not open to the atmosphere.

In the manufacturing method disclosed herein, the interior of the hard case is not open to the atmosphere after the sealing step, and so minimal equipment for maintaining a dry environment suffices, making it possible to largely curtail the expenses and trouble (upkeep, etc.) required to maintain such an environment. Moreover, because there is no need for special equipment and operations (such as opening the hard case or forcibly discharging gases from within the case) to discharge gases residing within the electrode assembly, the manufacturing method is simple and easy. In addition, the operations are simplified, which helps make it possible to hold down the ratio of defective product. Therefore, using this manufacturing method, such batteries having a stable battery performance (e.g., energy density) can be efficiently manufactured with greater ease and simplicity. Also, because the retention (residual presence) of gases within the electrode assembly is preferably low, enhancement of the battery characteristics (such as increasing the energy density and lowering the resistance) is possible.

In a preferred embodiment, the method of manufacturing a sealed lithium secondary battery disclosed herein further includes the step of, after the initial charging step and before the main charging step, allowing the battery to stand until the gases generated by initial charging are substantially vented from the electrode assembly.

By allowing the battery to stand after the initial charging step, gases generated within the electrode assembly (that is, at the surfaces of the electrodes and/or within the electrode mixture layers) can be fully discharged outside of the electrode assembly. This enables batteries of more stable quality to be manufactured.

In another preferred embodiment of the method of manufacturing a sealed lithium secondary battery disclosed herein, the standing step is carried out for at least 72 hours while holding the interior of the hard case after initial charging in a state that is not open to the atmosphere.

By holding the battery for this length of time, the gases generated within the electrode assembly can be more fully discharged outside of the electrode assembly, making it possible to efficiently manufacture batteries of even more stable quality.

In yet another preferred embodiment of the method of manufacturing a sealed lithium secondary battery disclosed herein, the sealing step is carried out in a state where the pressure within the case is reduced below 60 kPa abs.

By carrying out sealing in a reduced pressure state, the gases generated in the subsequently described initial charging step can be suitably discharged outside of the electrode assembly. Moreover, because the degree of pressure reduction within the hard case is larger than the pressure of the generated gases, swelling of the case can be suppressed. Hence, batteries of stable quality can be manufactured.

In a further preferred embodiment of the method of manufacturing a sealed lithium secondary battery disclosed herein, the initial charging step charges the battery to a potential which is at least 1 V but does not exceed the predetermined voltage in the main charging step.

By adjusting the battery voltage within this range, some of the electrolyte solution is decomposed, generating gases, along with which a solid electrolyte interphase (SE) film forms on the negative electrode active material surface. As a result, the interface between the negative electrode surface and the electrolyte solution stabilizes, enabling further decomposition of the electrolyte solution ingredients to be prevented. As a result, batteries of stable quality can be manufactured.

In a still further preferred embodiment of the method of manufacturing a sealed lithium secondary battery disclosed herein, the positive electrode has formed therein a positive electrode mixture layer containing, as a positive electrode active material, a lithium transition metal complex oxide having a layered structure.

In cases where a lithium-transition metal complex oxide having a layered structure is used as the positive electrode active material, excessive decomposition reactions on the above-described electrolyte solution are suppressed, enabling gas generation to be reduced. This makes it possible for such gases to be discharged outside of the electrode assembly without opening the hard case following the initial charging step or forcibly discharging gases from within the hard case. As a result, batteries of stable quality can be manufactured more simply and easily.

In another preferred embodiment of the method of manufacturing a sealed lithium secondary battery disclosed herein, the electrode assembly is a wound electrode assembly having a flattened shape, and the hard case having a rectangular shape that corresponds to the flattened shape is used.

In a wound electrode assembly having a flattened shape, because the surface pressure differs at corner portions and straight portions of the electrodes, the gases generated in the initial charging step have a tendency to reside in the straight portions which generally have a low surface pressure. However, with the manufacturing method disclosed herein, even in such cases, the generated gases can be more reliably discharged outside of the electrode assembly, thus enabling batteries of stable quality to be manufactured.

In yet another preferred embodiment of the method of manufacturing a sealed lithium secondary battery disclosed herein, the electrolyte solution is a nonaqueous electrolyte solution containing at least one type of carbonate.

Nonaqueous solvents composed primarily of carbonates decompose at the electrode surfaces in the initial charging step, enabling an SEI film to advantageously form on the negative electrode active material surface. As a result, batteries of stable quality can be manufactured.

This invention also provides a sealed lithium secondary battery (cell) manufactured by any of the methods disclosed herein. The invention also provides a battery pack obtained by combining a plurality of such batteries. In the case of a battery pack, decreases in the performances of some of the cells may lower the performance of the overall battery back. Hence, it is important to suppress variations in battery performance. Because the sealed lithium secondary batteries disclosed herein are characterized by having a stable battery performance (e.g., energy density), use as a battery pack is especially advantageous.

In addition, because the sealed lithium secondary battery disclosed herein has the above-described characteristics, it is well-suited for use as a driving power source for installation in vehicles such as automobiles. Therefore, the invention provides also vehicles that are equipped with such a battery pack (typically, electrically powered equipment such as plug-in hybrid vehicles (PHV), hybrid vehicles (HV), and electric vehicles (EV)).

DESCRIPTION OF EMBODIMENTS

In the present Description, "lithium secondary battery" refers to a secondary battery in which, using lithium ions as the electrolyte ions, charging and discharging are carried out by the movement of electrical charge associated with the lithium ions between positive and negative electrodes. The secondary batteries commonly called lithium ion batteries (or lithium ion secondary batteries), lithium polymer batteries, lithium-air batteries and lithium-sulfur batteries are typical examples encompassed by the lithium secondary battery in the present Description. In the present Description, "active material" refers to a substance (compound) that participates in the storage of electricity on the positive electrode side or the negative electrode side. That is, an active material refers here to a substance which participates in the intercalation and deintercalation of electrons during battery charging and discharging.

Preferred embodiments of the sealed lithium secondary battery disclosed herein are described below. Matters which are not specifically mentioned in the present Description but Which are necessary for working the invention will be understood as matters of design by persons of ordinary skill in the art which are based on related art in the field. The sealed lithium secondary battery of this structure can be realized based on details disclosed in the present Description and on common general technical knowledge in the field.

Figure 1A:
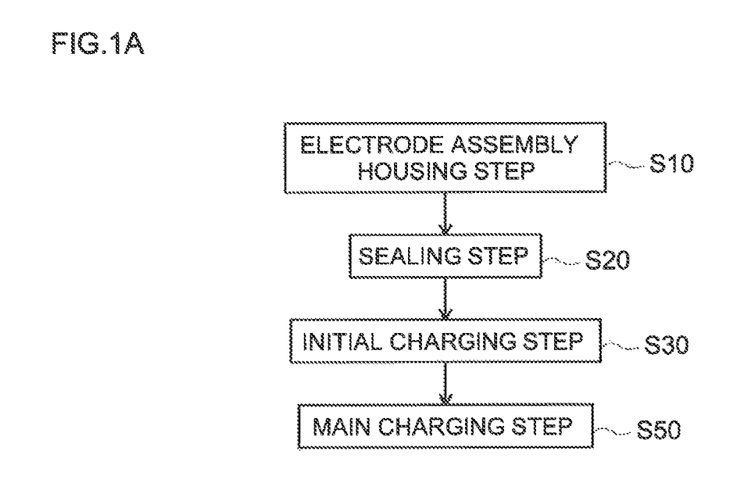
FIG. 1A is a flow chart for explaining the method of manufacturing sealed lithium secondary batteries according to one embodiment of the invention.
Figure 1B:
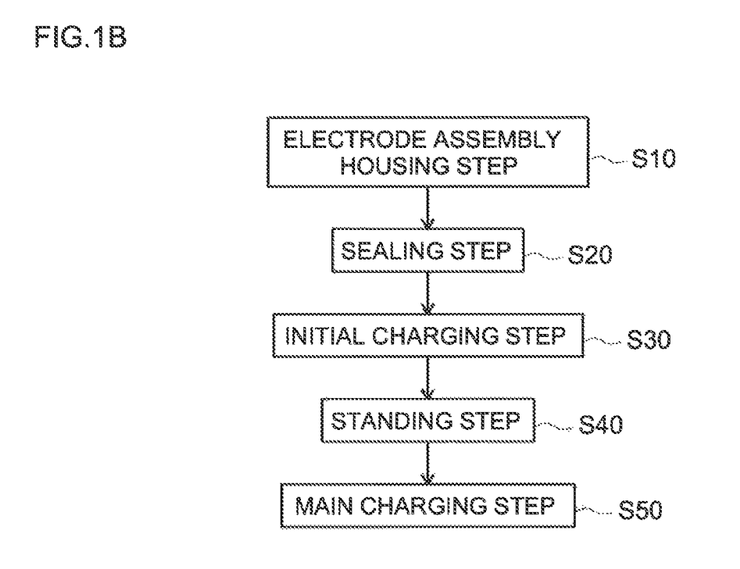
FIG. 1B is a flow chart for explaining the method of manufacturing sealed lithium secondary batteries according to another embodiment of the invention.

FIG. 1A shows a flow chart of the manufacturing method disclosed herein. More preferably, use can also be made of the method shown in the flow chart in FIG. 1B. That is, the manufacturing method disclosed herein includes the steps of housing an electrode assembly that includes a positive electrode and a negative electrode, and also an electrolyte solution, within a hard case (electrode assembly housing step; S10); negatively pressurizing the interior of the hard case and sealing the hard case in the negatively pressurized state (sealing step; S20); adjusting the battery to a voltage at which the electrode assembly generates gases (initial charging step; S30); and charging the battery to a predetermined voltage (main charging step; S50). In addition, as shown in the flow chart in FIG. 1B, it is more preferable to include also, between S30 and S50, the step of allowing the battery to stand until the gases generated in the initial charging step (S30) are substantially vented from the electrode assembly (standing step; S40). Preferred embodiments of this manufacturing method are described below.

<<Preparation of Battery Materials>>

First, the electrode assembly having a positive electrode and a negative electrode is prepared. The positive electrode used in the sealed lithium secondary battery disclosed herein is in a form obtained by mixing a positive electrode active material, a conductive material, a binder and the like in a suitable solvent so as to prepare a slurry-like (which may be understood to be inclusive of "paste-like" and "ink-like") positive electrode mixture layer-forming composition (referred to below as the "positive electrode mixture slurry"), then applying this slurry onto a positive electrode current collector to form a positive electrode mixture layer (also referred to as the positive electrode active material layer). A method that involves applying a suitable amount of the positive electrode mixture slurry to one or both sides of the positive electrode current collector, then drying the applied slurry, may be preferably used as the method of forming the positive electrode mixture layer. After drying the positive electrode mixture slurry, the thickness or density of the positive electrode mixture layer can be adjusted by carrying out a suitable pressing treatment.

Positive electrode current collector materials which may be used here include aluminum, nickel, titanium and stainless steel. The shape of the current collector is not particularly limited since it can vary in conformity with, for example, the shape of the battery being fabricated; however, for example, a rod-shaped article, plate-shaped article, foil, mesh, and so forth, can be used. A foil is mainly used in batteries provided with the wound electrode assembly described below. The thickness of the current collector foil is not particularly limited, but in order to obtain a good balance between the capacity density of the battery and the strength of the current collector, an approximately 5 µm to 50 µm (preferably 8 µm to 30 µm) current collector foil is preferably used.

One, two or more substances used in conventional lithium secondary batteries may be used without particular limitation here as the positive electrode active material. Illustrative examples include oxides containing as constituent metal elements both lithium and a transition metal element (lithium-transition metal oxides), such as lithium-nickel oxides (e.g., $LiNiO_2$), lithium-cobalt oxides (e.g., $LiCoO_2$) and lithium-manganese oxides (e.g., $LiMn_2O_4$); and phosphates containing as constituent metal elements both lithium and a transition metal element, such as lithium manganese phosphate ($LiMnPO_4$) and lithium iron phosphate ($LiFePO_4$).

Of these, positive electrode active materials composed primarily of a lithium nickel cobalt manganese complex oxide having a layered structure (also referred to as "NCM"; such as $LiNi_{1/3}Co_{1/3}Mn_{1/3}O_2$) (typically, positive electrode active materials composed substantially of a lithium nickel cobalt manganese complex oxide) can be advantageously used because they have an excellent heat stability and a high energy density. In batteries in which NCM is used as the positive electrode active material, excessive decomposition reactions on the electrolyte solution are suppressed in the subsequently described initial charging step, enabling the generation of gases to be reduced. As a result, gases on the outside of the electrode assembly can be vented by merely allowing the battery to stand for a sufficient length of time; that is, without carrying out a special operation following the initial charging step (such as opening the hard case, or forcibly discharging gases from within the case).

Although not subject to any particular limitation, the positive electrode active material accounts for, as a proportion of the overall positive electrode mixture layer, typically at least about 50 mass % (typically from 70 mass % to 99 mass %), and preferably from about 80 mass % to about 99 mass %.

Here, the meaning of lithium nickel cobalt manganese complex oxide, besides referring to oxides in which the structural metal elements are Li, Ni, Co, and Mn, also encompasses oxides that contain at least one metal element other than Li, Ni, Co, and Mn (i.e., a transition metal element and/or a main-group metal element other than Li, Ni, Co, and Mn). This metal element can be exemplified by one or two or more elements from aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (in), tin (Sn), lanthanum (La) and cerium (Ce). The same also applies to the lithium nickel oxides, lithium cobalt oxides and lithium manganese oxides as well. A lithium transition metal oxide powder prepared by a method known to the art may be used without modification as such a lithium-transition metal oxide (typically in the form of particles).

The conductive material can specifically be a single selection or two or more selections from carbonaceous materials such as carbon blacks (e.g., acetylene black, Ketjen black), graphite powders (natural or synthetic), carbon fibers (PAN-based carbon fibers, pitch-based carbon fibers) and so forth. Alternatively, use may be made of metal fibers (e.g., aluminum, stainless steel), conductive metal powders (e.g., silver (Ag), nickel (Ni), copper (Cu)), metal oxides (e.g., ZnO, $SnO_2$), and synthetic fibers surface-coated with metal. Of these, acetylene black is a preferred carbon powder.

Although not particularly limited, the proportion of conductive material in the overall positive electrode mixture layer may be set to from about 0.1 mass % to about 15 mass %, and is preferably set to from about 1 mass % to about 10 mass % (more preferably from about 2 mass % to about 6 mass %).

One, two or more substances used in conventional lithium secondary batteries may be used without particular limitation as the binder here. Typically, preferred use can be made of various polymer materials. For example, in cases where a positive electrode mixture layer is formed using an aqueous liquid composition, preferred use can be made of a polymer material which dissolves or disperses in water. Such polymer materials are exemplified by cellulosic polymers, fluororesins, vinyl acetate copolymers and rubbers. Illustrative examples include carboxymethylcellulose (CMC), hydroxypropyl methylcellulose (HPMC), polyvinyl alcohol (PVA), polytetrafluoroethylene (PTFE), tetrafluoroethylene-hexafluoropropylene copolymers (FEP), styrene-butadiene rubbers (SBR), and acrylic acid modified SBR resins (SBR latex). Alternatively, in cases where a positive electrode mixture layer is formed using a solvent-based liquid composition (a solvent-based composition in which the main ingredient of the dispersion medium is an organic solvent), preferred use can be made of a polymeric material which disperses or dissolves in an organic solvent. Illustrative examples of such polymeric materials include polyvinylidene fluoride (PVH), polyvinylidene chloride (PVdC), and polyethylene oxide (PEO).

Although not particularly limited, the proportion of the overall positive electrode mixture layer accounted for by the binder may be set to, for example, from about 0.1 mass % to about 1.0 mass %, and preferably from about 1 mass % to about 5 mass %.

One, two or more solvents from among those used in conventional lithium secondary batteries may be used without particular limitation here as the solvent. Such solvents are broadly divided into aqueous and organic solvents. An aqueous solvent is preferably water or a mixed solvent composed primarily of water. One, two or more organic solvents capable of uniformly mixing with water (such as lower alcohols and lower ketones) may be suitably selected and used as the solvents other than water making up such mixed solvents. For example, it is preferable to use an aqueous solvent in which at least about 80 mass % (more preferably at least about 90 mass %, and even more preferably at least about 95 mass %) of the aqueous solvent is water. Especially preferred examples include aqueous solvents (e.g., water) which are substantially composed of water.

Exemplary organic solvents include amides, alcohols, ketones, esters, amines, ethers, nitriles, cyclic ethers and aromatic hydrocarbons. Illustrative examples include N-methyl-2-pyrrolidone (NMP), N,N-dimethylformamide (DMF), N,N-dimethylacetamide, 2-propanol, ethanol, methanol, acetone, methyl ethyl ketone, methyl propenate, cyclohexanone, methyl acetate, ethyl acetate, methyl acrylate, diethyltriamine, N,N-dimethylaminopropylamine, acetonitrile, ethylene oxide, tetrahydrofuran dioxane, benzene, toluene, ethyl benzene, xylem, dimethylsulfoxide (DMSO), dichloromethane, trichloromethane and dichloroethane.

Where necessary, various additives (e.g., material capable of functioning as dispersants, and inorganic compounds which generate a gas during overcharging) may also be included in the positive electrode mixture slurry prepared here. Exemplary dispersants include polymer compounds having a hydrophobic chain and hydrophilic groups (e.g., alkali salts, and typically sodium salts); anionic compounds such as sulfuric acid salts, sulfonic acid salts and phosphoric acid salts; and cationic compounds such as amines. Illustrative examples include carboxymethylcellulose (CMC), methyl cellulose, ethyl cellulose, hydroxypropyl cellulose, butyral, polyvinyl alcohol, modified polyvinyl alcohol, polyethylene oxide, polyvinyl pyrrolidone, polycarboxylic acid, oxidized starch and phosphate starch. Preferred use may be made of a water-soluble polymer material such as carboxymethylcellulose.

In the manufacturing method disclosed herein, the negative electrode of the sealed lithium secondary battery is in a form obtained by mixing a negative electrode active material, a binder and the like in a suitable solvent so as to prepare a slurry-like (which may be understood to be inclusive of "paste-like" and "ink-like") negative electrode mixture layer forming composition (referred to below as the "negative electrode mixture slurry"), then applying this slurry onto a negative electrode current collector to form a negative electrode mixture layer (also referred to as the negative electrode active material layer). A method that involves applying a suitable amount of the negative electrode mixture slurry to one or both sides of the negative electrode current collector, then drying the applied slurry, may be preferably used as the method of forming the negative electrode mixture layer. After drying the negative electrode mixture slurry, the thickness or density of the negative electrode mixture layer can be adjusted by carrying out a suitable pressing treatment.

Negative electrode current collector materials which may be used here include copper, nickel, titanium and stainless steel. The shape of the current collector is not particularly limited since it can vary in conformity with, for example, the shape of the battery being fabricated; however, for example, a rod-shaped article, plate-shaped article, foil, mesh, and so forth, can be used. A foil is mainly used in batteries provided with the wound electrode assembly described below. The thickness of the current collector foil is not particularly limited, but in order to obtain a good balance between the capacity density of the battery and the strength of the current collector, an approximately 5 μm to 50 μm (preferably 8 μm to 30 μm) current collector foil is preferably used.

One, two or more substances used in conventional lithium secondary batteries may be used without particular limitation here as the negative electrode active material. Illustrative examples include particulate graphite powder (carbon particles) containing in a least some portion thereof a graphite structure (layer structure), oxides such as lithium titanium oxide (LTO), and alloys of tin (Sn) or silicon (Si) with lithium. Examples of graphite powders that may be used include graphite, non-graphitizable carbon (hard carbon), graphifizable carbon (soft carbon), and combinations thereof. Of these, preferred use can be made of graphite. The graphite may be of one, two or more types selected from among, for example, natural graphites (plumbago) collected from naturally occurring minerals, synthetic graphites produced from petroleum or coal-based materials, and processed graphites obtained by subjecting the above graphites to processing such as grinding and pressing.

Although not particularly limited, the proportion of the overall negative electrode mixture layer accounted for by the negative electrode active material is generally at least about 50 mass %, and preferably from about 90 mass % to about 99 mass % (e.g., from about 95 mass % to about 99 mass %).

The binder used here may be a suitable one that is selected from among the polymer materials mentioned above as binders for the positive electrode mixture layer. Illustrative examples include polyvinylidene fluoride (PVdF), polytetrafluoroethylene (PTFE) and styrene-butadiene rubber (SBR). Although not subject to any particular limitation, the proportion of the overall negative electrode mixture layer accounted for by the binder may be set to, for example, from 0.1 mass % to 10 mass % (preferably from 0.5 mass % to 5 mass %).

The solvent used here may be a suitable one selected from among the solvents mentioned above as solvents that can be used when forming the above-described positive electrode mixture layer.

The above-described positive electrode and negative electrode are stacked as layers to produce an electrode assembly. The shape of this electrode assembly is not particularly limited. For example, use may be made of a wound electrode assembly obtained by stacking as layers and winding together a long strip-shaped positive electrode in which a positive electrode mixture layer of a given width has been formed on a long strip-shaped positive electrode current collector in the lengthwise direction of the positive electrode current collector, and a long strip-shaped negative electrode in which a negative electrode mixture layer of a given width has been formed on a long strip-shaped negative electrode current collector in the lengthwise direction of the negative electrode current collector. In cases where such an electrode assembly has a flattened shape obtained by lateral pressing, because the surface pressure differs in the corner portions and the straight portions of the electrode assembly, the gases generated in the initial charging step have a tendency to reside in the straight portions which have a low surface pressure. This in turn may lead to a decline in the battery characteristics. However, with the production method disclosed herein, as shown in the subsequently described examples, because the gases generated can be discharged outside of the electrode assembly even in such cases, batteries of stable quality can be manufactured.

The sealed lithium secondary battery disclosed herein typically has a construction in which a separator is interposed between the positive electrode and the negative electrode. Various porous sheets like those used in conventional lithium secondary batteries may be used here as the separator. Illustrative examples include porous resin sheets (film, nonwoven fabric, etc.) composed of a resin such as polyethylene (PE), polypropylene (PP), polyester, cellulose or polyamide. Such porous resin sheets may have a single-layer construction or a multilayer construction of two or more layers (e.g., a three-layer construction in which PP layers have been stacked on both sides of a PE layer). In sealed lithium secondary batteries (lithium polymer batteries) which use a solid electrolyte solution, the construction may be one in which the electrolyte serves also as the separator.

<<Electrode Assembly Housing Step (S10)>>

Next, the above electrode assembly and the electrolyte solution are placed within a suitable hard case. The hard case used here may be of a material and shape used in conventional lithium secondary batteries. The material making up the hard case may be, for example, a metal material such as aluminum or steel, or a resin material such as polyolefin or polyimide. Of these, for such reasons as the ability to increase heat dissipation and energy density, the use of a hard case made of a relatively lightweight metal (e.g., aluminum or an aluminum alloy) is preferred. The shape (outside shape of the container) is not particularly limited and may be, for example, circular (cylindrical, coin-like, button-like) or have a six-sided shape (such as that of a rectangular prism or cube). In addition, the battery may be provided with safety mechanisms such as a current interrupt device (a device which can interrupt the current in response to a rise in internal pressure during overcharging of the battery).

One, two or more nonaqueous electrolyte solutions of the same types as those used in conventional lithium secondary batteries may be used here without particular limitation as the electrolyte solution. These nonaqueous electrolyte solutions typically have a composition that includes an electrolyte (lithium salt) in a suitable nonaqueous solvent.

The nonaqueous solvent is exemplified by aprotic solvents such as carbonates, esters, ethers, nitriles, sulfones and lactones. Illustrative examples include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane and γ-butyrolactone. Of these, preferred use can be made of nonaqueous solvents composed primarily of carbonates because, in the subsequently described initial charging step, they are reduced and decomposed on the negative electrode surface and are able to form a solid electrolyte interphase (SEI) film on the surface of the negative electrode active material. Favorable for use thereamong are EC, which has a high dielectric constant, and DMC and EMC, which have high oxidation potentials (wide potential windows).

This electrolyte solution may be an electrolyte solution in solid form (gel-like) that has been obtained by adding a polymer to a liquid electrolyte solution.

Illustrative examples of the electrolyte include $LiPF_6$, $LiBF_4$, $LiClO_4$, $LiN(SO_2CF_3)_2$, $LiN(SO_2C_2F_5)_2$, $LiCF_3SO_3$, $LiC_4F_9SO_3$, $LiC(SO_2CF_3)_3$ and $LiClO_4$. Of these, the use of $LiPF_6$ is preferred. The concentration of the electrolyte is not particularly limited. However, if the electrolyte concentration is too low, there is a tendency for the amount of lithium ions included in the electrolyte solution to be inadequate and for the ionic conductivity to decrease. On the other hand, if the concentration of supporting electrolyte is too high, there is a tendency for the viscosity of the nonaqueous solution to become too high, lowering the ionic conductivity. Hence, preferred use can be made of a nonaqueous electrolyte solution containing the electrolyte in a concentration of from about 0.1 mol/L to about 5 mol/L (preferably from about 0.8 mol/L to about 1.5 mol/L).

In addition, various types of additives may be included in the electrolyte solution used here, such as additives for enhancing battery performance (e.g., vinylene carbonate (VC), fluoroethylene carbonate (FEC)) and overcharge-preventing agents (this refers to compounds which are decomposed, generating a large amount of gas, when the battery is in an overcharged state; typical examples include biphenyl (BP) and cyclohexylbenzene (CHB)).

<<Sealing Step (S20)>>

Next, the interior of the hard case in which the electrode assembly and the electrolyte solution have been housed is subjected to pressure-reducing treatment and thereby set in a negatively pressurized state. This step may consist of treatment in which a vacuum pump or the like is connected to the opening in the hard case prior to sealing, and gases within the case (typically dry air or inert gases) are drawn off. By using such vacuum-drawing treatment and subjecting the interior of the case to pressure-reducing treatment to a state having, for example, a pressure lower than 60 kPa abs (typically from about 10 kPa abs to about 60 kPa abs), the gases generated in the subsequently described initial charging step can be suitably discharged from the interior of the electrode assembly. Because the degree of pressure reduction within the hard case is larger than the pressure of the generated gases, swelling of the case can be suppressed. Hence, batteries of stable quality can be manufactured.

In the present Description, the degree of pressure reduction denotes the absolute pressure relative to an absolute vacuum, which is expressed as 0 kPa (atmospheric pressure being 101.3 kPa). To distinguish this from the relative pressure, the units of absolute pressure are denoted as "kPa abs."

The preferred degree of pressure reduction in vacuum-drawing treatment may differ according to the amount of gases generated in the subsequently described initial charging step. Factors that have an influence on this amount of gas include the amount of moisture contained, the types of active materials (positive electrode active material and/or negative electrode active material), the type of electrolyte solution, the shape of the electrode assembly, and the shape of the hard case. In addition, generally, the closer vacuum drawing is to an absolution vacuum (0 kPa abs), the shorter the length of time required for the subsequently described standing step. Such pressure reduction may be carried out all at once or may be carried out in stages.

Next, with the interior of the hard case having been placed in a negatively pressurized state, the case is sealed. In the manufacturing method disclosed herein, such sealing may be carried out by a method similar to the methods used in conventional sealed lithium secondary batteries. For example, when a hard case made of metal is used, techniques such as laser welding, resistance welding or electron beam welding may be used. When a nonmetallic case (e.g., a case made of a resin material) is used, a technique such as bonding with an adhesive or ultrasonic welding may be used.

This step is generally carried out within a clean room (dry room) or a glove box that maintains an environment held in a very low humidity state (a dry environment; typically, an environment having a dew point of −20° C. or below). The interior of the dry environment is filled with, for example, dry air or an inert gas such as argon. This makes it possible to reduce, of the gases generated in the subsequently described initial charging step, the amount of those gases which originate from moisture.

The operation of reducing the pressure at the interior of the hard case and the operation of sealing the case were explained separately above, although these (Pressure reduction and welding) may be carried out as a series of operations.

<<Initial Charging Step (S30)>>

Next, initial charging is carried out in which the battery after the above sealing step is adjusted to at least the voltage at which the electrode assembly generates gases. In the initial charging step of the manufacturing method disclosed here, the trace amount of moisture included in the battery members and some of the electrolyte solution decompose at the surface of the electrodes, generating gases (e.g., hydrogen ($H_2$)), along with which a solid electrolyte interphase (SET) film forms on the surface of the negative electrode active material. The interface between the negative electrode surface and the electrolyte solution is thereby stabilized, enabling further decomposition of the electrolyte solution ingredients to be prevented. However, if the adjusted potential is too high, this may have an adverse influence on the battery characteristics, such as promoting electrolyte solution-decomposing reactions. The adjusted potential may differ depending on the electrolyte solution used and other factors. For example, it may be adjusted so as to be at least 1 V but not above a predetermined voltage in the above main charging step (e.g., at least 1 V but not more than 3.5 V, preferably at least 2 V but not more than 3.5 V, and more preferably at least 3 V but not more than 3.5 V).

This adjustment of the potential may be carried out by constant-current charging (CC charging) at a rate of from about 1/10 C to about 10 C (preferably from about 1/10 C to about 5 C, and more preferably from about 1/10 C to about 1 C) from the start of charging until the voltage between the positive and negative electrode terminals reaches a given value. Alternatively, adjustment of the potential may be carried out by constant-current, constant-voltage charging (CC-CV charging) that entails charging at a constant current of from about 1/10 C to about 10 C (preferably from about 1/10 C to about 5 C, and more preferably from about 1/10 C to about 1 C) from the start of charging until the voltage between the positive and negative electrode terminals reaches a given value, then charging at a constant voltage for a given length of time. Charging may be carried out once, or two or more charge/discharge operations may be carried out repeatedly.

For example, in the subsequently described examples, by constant-current charging the battery at a rate of 1 C for 720 hours, the generation of gases can be substantially brought to completion. Moreover, because it is possible with this step to suppress the generation of gases in subsequent charging steps (e.g., the subsequently described main charging step), batteries of stable quality can be manufactured. In addition, improvements in the battery characteristics (such as a decrease in the charge transfer resistance and an increase in energy density) can be advantageously achieved.

<<Standing Step (S40)>>

It is preferable here to allow the battery to stand until the gases generated in the initial charging step are substantially vented from the interior of the electrode assembly. The manufacturing method disclosed herein is simple and easy because no special equipment or operations (such as opening the hard case or forcibly discharging gases from within the case) are needed to discharge gases residing within the electrode assembly.

As used herein, "until the gases generated . . . are substantially vented from the electrode assembly" typically refers to the time it takes for at least about 90% of the generated gases to be vented from the electrode assembly, and preferably refers to the time it takes for at least about 95% of the generated gases to be vented from the electrode assembly. However, minor differences of a degree that do not strongly affect battery performance, such as 90% and 89%, are also subsumed within the range of the expression ° substantially' as used herein.

The time required for this step may differ depending on conditions such as the degree of pressure reduction in the sealing step, and on the amount of gases generated in the initial charging step. Although it is also possible to hold the battery in this state for a long time, provided doing so does not have a large influence on the battery characteristics, from the standpoint of production efficiency and other considerations, completing this step in a shorter time is preferred. In one preferred embodiment, the standing step is carried out for at least 72 hours (and preferably at least 96 hours) but not more than 240 hours (and preferably not more than 120 hours) while maintaining the interior of the hard case after initial charging in a state that is not open to the atmosphere. By allowing the battery to stand for this length of time, gases at the surface of the electrode and/or within the electrode mixture layers can be efficiently discharged outside of the electrode assembly. In certain cases, such as when the amount of generated gases is very small, this step can even be omitted. It is also possible to make joint use of an operation that promotes the discharge of gases from within the electrode assembly, provided this has no major adverse effects on the battery characteristics.

<<Main Charging Step (S50)>>

Next, main charging, in which the battery following the above standing step is charged to a predetermined voltage, is carried out. The main charging step can be carried out by, for example, constant-current, constant-voltage charging (CC-CV charging) that entails charging at a constant current of about 1/10 C to about 10 C from the start of charging until the voltage between the positive and negative electrode terminals reaches a given value, then charging at a constant voltage. Here, "predetermined voltage" refers to the voltage at which the battery is actually used, this being typically at least the battery voltage in the above initial charging step, and not above the voltage at which the electrolyte solution does not oxidatively decompose. More specifically, in a battery constructed as in the subsequently described examples, the predetermined voltage is at least 3V (typically, at least 3.5 V, preferably at least 3.7 V, and more preferably at least 4.0 V), but not more than 4.5 V (typically, less than 4.5 V, and preferably not more than 4.3 V). The manufacturing method disclosed herein is characterized in that the interior of the hard case is not opened to the atmosphere from the sealing step (S10) to the main charging step (S50). As a result, there is minimal need for equipment to maintain a dry atmosphere, enabling the costs and trouble (upkeep, etc.) required to maintain such an environment to be largely curtailed.

Figure 2:
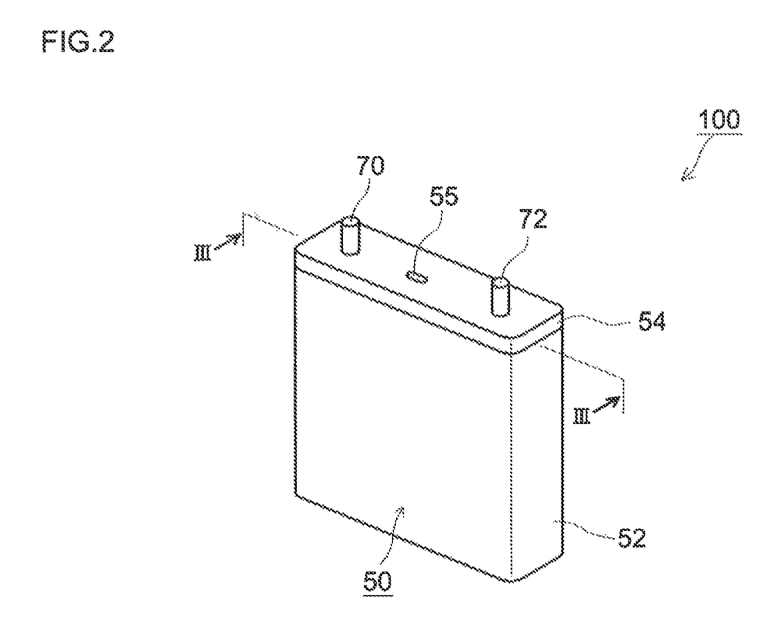
FIG. 2 is a perspective view schematically showing the exterior of a sealed lithium secondary battery according to an embodiment of the invention.
Figure 3:
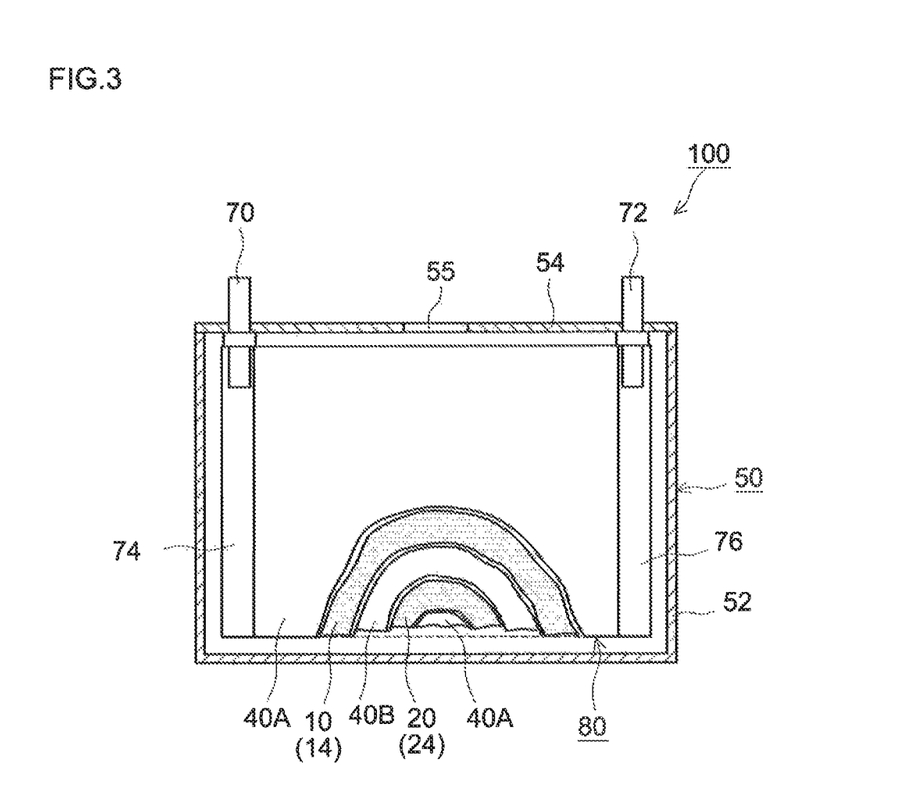
FIG. 3 is a schematic view showing the structure of a sealed lithium secondary battery according to an embodiment of the invention.
Figure 4:
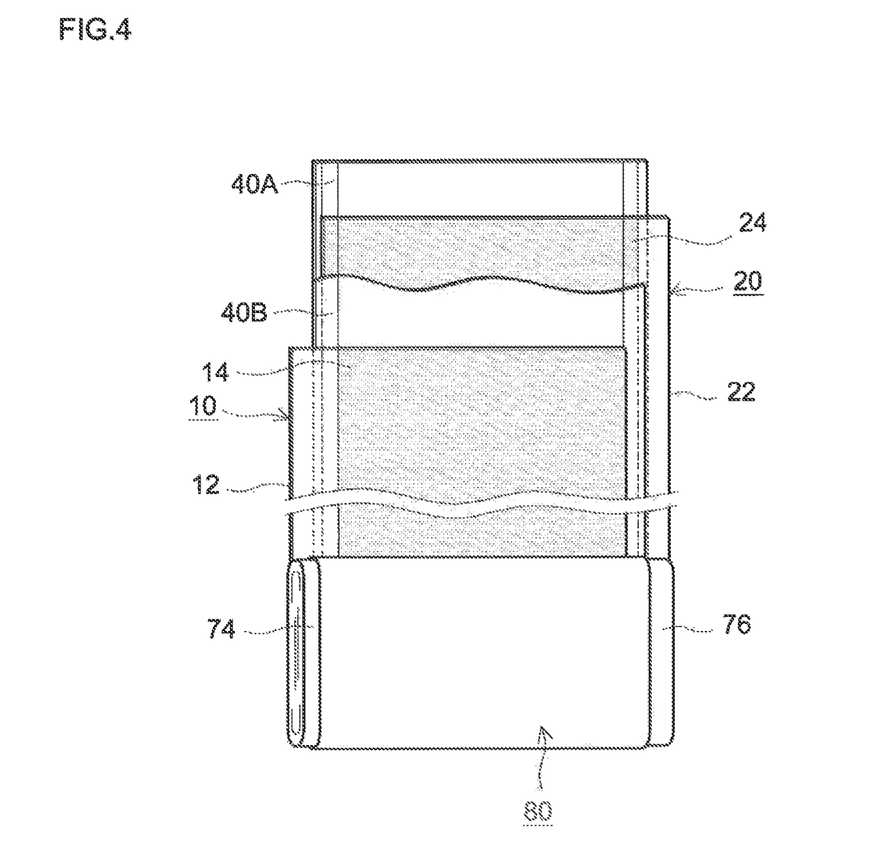
FIG. 4 is a schematic view showing the structure of a wound electrode assembly for a sealed lithium secondary battery according to an embodiment of the invention.
Figure 5:
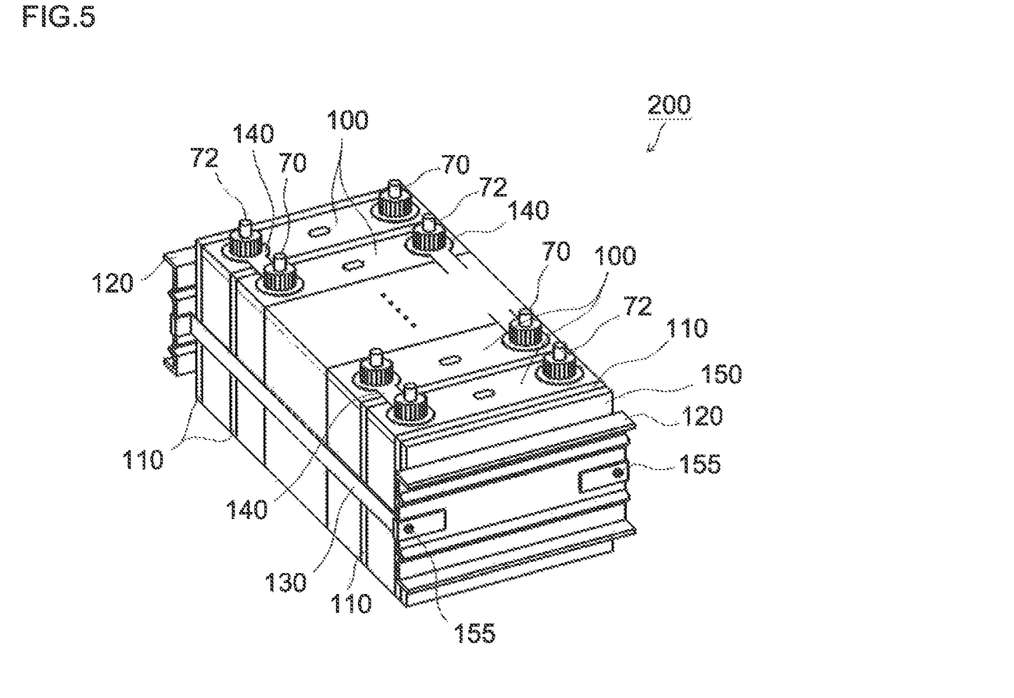
FIG. 5 is a perspective view schematically showing a battery pack in which have been combined a plurality of sealed lithium secondary batteries according to an embodiment of the invention.

Without intending to be limitative of the invention, to schematically illustrate the construction of a sealed lithium secondary battery according to one embodiment thereof, FIGS. 2 to 4 schematically show the structure of a sealed lithium secondary battery (cell) in a form in which a flattened and wound electrode assembly (wound electrode assembly) and a nonaqueous electrolyte solution are housed within a container of flat, rectangular (box-like) shape. In addition, FIG. 5 schematically shows a battery pack having a construction in which a plurality of cells according to one embodiment of the invention have been connected and arrayed together. In the description of these diagrams below, members or features having like functions are designated by like symbols, and repeated explanations may be omitted or simplified. The dimensional relationships (length, width, thickness, etc.) in the respective diagrams do not reflect true dimensional relationships.

FIG. 2 is a perspective view schematically showing the exterior of a sealed lithium secondary battery 100 according to an embodiment of the invention. FIG. 3 is a schematic view showing the structure, in a longitudinal section taken along line III-III, of the sealed lithium secondary battery shown in FIG. 2.

As shown in FIGS. 2 and 3, the sealed lithium secondary battery 100 according to this embodiment has a hard case (outer container) 50 made of metal or a nonmetallic material. The hard case 50 includes a hard case body 52 of flat, rectangular (box-like) shape that is open on top, and a lid 54 which closes the opening. A positive electrode terminal 70 that is electrically connected to a positive electrode sheet 10 of a wound electrode assembly 80, and a negative electrode terminal 72 that is electrically connected to a negative electrode sheet 20 of the electrode assembly are provided on a top side (i.e., the lid 54) of the hard case 50. As in the hard cases of conventional sealed lithium secondary batteries, the lid 54 is provided with a safety valve 55 for discharging to the exterior of the case gases that have been evolved at the case interior during battery malfunction.

An electrode assembly (wound electrode assembly) 80 in a form obtained by winding together, in a flattened manner, a long strip-shaped positive electrode sheet 10 and a long strip shaped negative electrode sheet 20 with long strip-shaped separators 40A and 40B interposed therebetween is housed together with a nonaqueous electrolyte solution (not shown) at the interior of the hard case 50. The positive electrode current collecting plate on an edge 74 of the positive electrode sheet 10 where a positive electrode mixture layer has not been formed (i.e., the exposed portion of the positive electrode current collector), and the negative electrode current-collecting plate on an edge 76 of the negative electrode sheet 20 where a negative electrode mixture layer has not been formed (i.e., the exposed portion of the negative electrode current collector) are electrically connected to, respectively, the positive electrode terminal 70 and the negative electrode terminal 72.

FIG. 4 is a diagram schematically showing the long strip-shaped sheet structure (electrode sheet) in an early stage of assembly of the wound electrode assembly 80. A positive electrode sheet 10 composed of a positive electrode mixture layer 14 formed in the longitudinal direction on one or both sides (typically both sides) of a long strip-shaped positive electrode current collector 12, and a negative electrode sheet 20 composed of a negative electrode mixture layer 24 formed in the longitudinal direction on one or both sides (typically both sides) of a long strip-shaped negative electrode current collector 22 are stacked as successive layers together with two long strip-shaped separators 40A and 40B, and wound in the lengthwise direction to produce a wound electrode assembly. By laterally pressing and flattening this wound electrode assembly, a wound electrode assembly 80 of flattened shape can be obtained.

FIG. 5 shows an example of a battery pack 200 having a plurality of the sealed lithium secondary batteries (cells) 100 (typically, a battery pack in which a plurality of cells are connected in series). In this battery pack 200, a plurality of (the number being typically at least 10, and preferably about 10 to 30, such as 20) sealed lithium secondary batteries (cells) 100 are arrayed with every other battery reversed so that the positive electrode terminal 70 and the negative electrode terminals 72 of the respective batteries are alternately arranged, and with the broad sides of the hard cases 50 facing one another (in the stacking direction). Cooling plates 110 of a given shape are inserted between these arrayed cells 100. These cooling plates 110 function as heat-dissipating members for efficiently dissipating heat generated within each cell 100 during use, and preferably have a shape that allows a cooling fluid (typically air) to be introduced between the cells 100 (e.g., a shape in which a plurality of parallel channels that extend perpendicularly from one side of a rectangular cooling plate to the opposite side are provided on the surface). Cooling plates made of a metal having a good heat conductivity, or of a polypropylene or other synthetic resin that is lightweight and hard, are suitable.

A pair of end plates (restraining plate) 120 are disposed at both ends of the arrayed cells 100 and cooling plates 110. One or a plurality of sheet-like spacer members 150 may be inserted as length-adjusting means between the cooling plates 110 and the end plates 120. The cells 100, cooling plates 110 and spacer members 150 thus arrayed are restrained, in such manner as to apply as given restraining pressure in the stacking direction, by a restraining band 130 for tightening that has been attached so as to span between both end plates. More specifically, by tightening and securing the ends of the restraining band 130 to end plates 120 with screws 155, the cells and other members are restrained in such manner as to apply a given restraining pressure in the direction in which the members are arrayed. As a result, a restraining pressure also acts upon the wound electrode assemblies 80 housed at the interior of the hard cases 50 of the respective cells 100.

Moreover, on mutually adjoining cells 100, the positive electrode terminal 70 of one cell and the negative electrode terminal 72 of the other cell are electrically connected by a connecting member (bus bar) 140. A battery pack 200 of the desired voltage is built by thus connecting the respective cells 100 in series.

Figure 6:
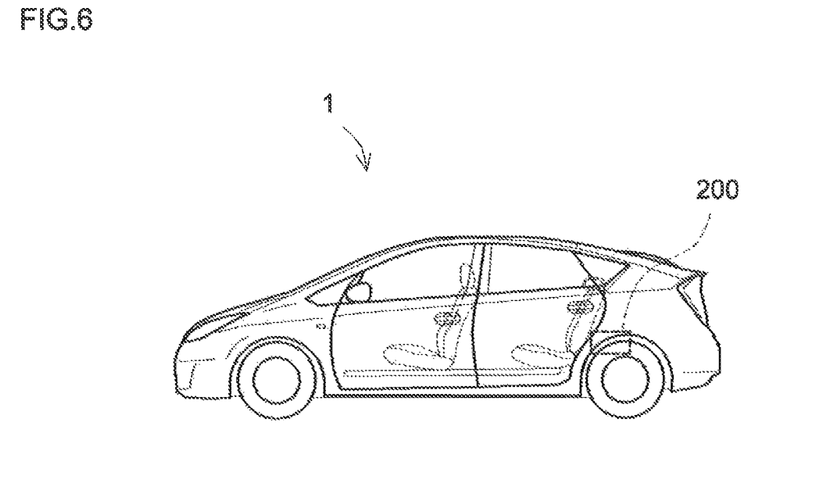
FIG. 6 is a side view schematically showing a vehicle (automobile) equipped with, as a power source for driving the vehicle, a battery pack according to an embodiment of the invention.

Sealed lithium secondary batteries manufactured by the method disclosed herein are characterized by having a stable quality, and thus can be utilized in various applications. Moreover, because these batteries can be advantageously used as battery packs obtained by combining a plurality of such batteries, use in applications requiring high energy density and power density is possible. For example, as shown in FIG. 6, the sealed lithium secondary battery 100 (preferably, the battery pack 200 formed by connecting together a plurality of such batteries 100) disclosed herein can be advantageously used as a power source which is used for driving the motor of a vehicle 1 such as an automobile, and is required to have a high energy density. The type of vehicle 1 is not particularly limited; typical examples include plug-in hybrid vehicles (PHV), hybrid vehicles (HV) and electric vehicles (EV).

The invention is illustrated more concretely below by way of test examples, although the examples that follow are not intended to limit the invention in any way.

With regard to the manufacturing method disclosed herein, to confirm the technical significance of sealing the interior of the hard case in a negatively pressurized state, a sealed lithium secondary battery obtained by carrying out pressure-reducing treatment in the sealing step and a sealed lithium secondary battery which was sealed without carrying out pressure-reducing treatment in this step (i.e., in an atmospheric pressure state) in this step were each built, and the amounts of gas retained at the interior of the electrode assemblies in each of these batteries were compared.

At the same time, to investigate the preferred standing time (i.e., the time from the initial charging step to the main charging step) in the standing step which is a characteristic step in the manufacturing method disclosed herein, a study on the influence of this standing time on the amount of gas remaining within the electrode assembly was also carried out.

[Preparation of Battery Materials]

First, a positive electrode mixture slurry was prepared by mixing a $LiNi_{1/3}Co_{1/3}Mn_{1/3}O_2$ powder as the positive electrode active material powder, acetylene black as the conductive material and polyvinylidene fluoride (PVdF) as the binder, in a mass ratio therebetween of 91:6:3, together with N-methylpyrrolidone (NMP) to a nonvolatiles content (NV value) of 55 mass %. This slurry was coated onto both sides of a long strip-shaped aluminum foil (positive electrode current collector) having a thickness of about 15 μm, whereby a positive electrode mixture layer is formed, dried, then pressed to give a sheet-like positive electrode (positive electrode sheet).

Next, an aqueous negative electrode mixture slurry was prepared by mixing natural graphite as the negative electrode active material, styrene-butadiene rubber (SBR) as the binder and carboxymethyl cellulose (CMC) as the disperser, in a mass ratio therebetween of 98:1:1, together with ion-exchanged water to a nonvolatiles content (NV value) of 50 mass %. This slurry was coated onto both sides of a long strip-shaped copper foil (negative electrode current collector) having a thickness of about 10 μm, whereby a negative electrode mixture layer is formed, dried, then pressed to give a sheet-like negative electrode (negative electrode sheet).

[Electrode Assembly Housing Step]

An electrode assembly was produced by stacking the positive electrode sheet and the negative electrode sheet produced above with two separators (porous polyethylene (PE) was used here) interposed therebetween, and winding the stacked layers. This electrode assembly was placed in a prismatic hard case together with a nonaqueous electrolyte solution (the electrolyte solution used here was obtained by dissolving $LiPF_6$ as the electrolyte to a concentration of about 1 mold, in a mixed solvent containing ethylene carbonate (EC), dimethyl carbonate (DMC) and ethyl methyl carbonate (EMC) in a volumetric ratio of 3:4:3).

[Sealing Step]

Next, sealed lithium secondary batteries (working example of the invention) were built by drawing a vacuum on the interior of the hard case and thus setting it in a negatively pressurized state (set to 16 kPa abs here) then attaching the lid to the opening in the case and joining it to the case by laser welding. To determine the preferred standing time in the subsequently described standing step, seven similar batteries were test-built here.

In addition, aside from sealing the interior of the hard case without placing it in pressure-reduced state (that is, aside from sealing the hard case in an atmospheric pressure state), sealed lithium secondary batteries (reference example) were built in the same way as in the working example of the invention. To determine the preferred standing time in the subsequently described standing step, three similar batteries were test-built here.

[Initial Charging Step→Standing Step→Main Charging Step]

All of the above batteries after being sealed were constant-current charged at a rate of 1 C for 720 seconds. Next, after the standing time shown in Table I had elapsed, the batteries were constant-current charged at a charging rate of 1 C up to 4.1 V (main charging step).

TABLE 1

| | Sealing step | | |
|---|---|---|---|
| | Pressure-reducing treatment | Pressure in hard case | Standing step Standing time (h) |
| Working example | yes | 16 kPa abs | 0, 12, 24, 48, 72, 96, 120 |
| Reference example | no | atmospheric pressure | 0, 48, 120 |

The time required for charging (charging time, sec) was used as the indicator for the amount of gas retained (remaining) within the electrode assembly. That is, in cases where gases are retained within the electrode assembly (i.e., at the surface of the electrodes and/or within the electrode mixture layers) during charging, because such gases repeatedly disperse and concentrate, there alternately appear at the interior of the electrode assembly portions which are in contact with gas and thus incapable of charging and portions which are in contact with electrolyte solution and are thus charged. Hence, compared with a battery in which gases are not retained at the interior of the electrode assembly, the time until the prescribed voltage is attained increases (that is, the battery enters into a state where the charging current continues flowing interminably). Therefore, by comparing the charging times for the respective batteries (here, the sum of the time in the initial charging step (720 seconds) and the time required for the main charging step (seconds)), it is possible to evaluate the relative amount of gases present within the electrode assembly.

Figure 7:
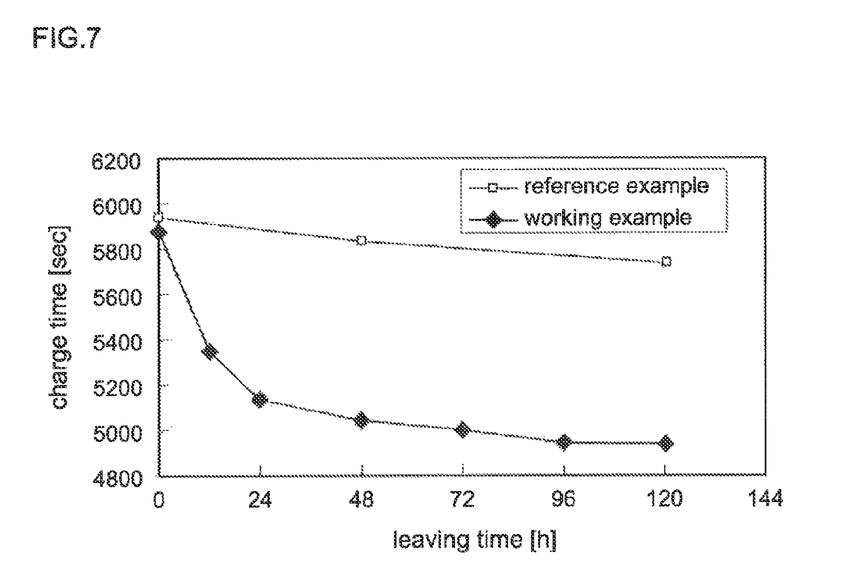
FIG. 7 is a graph showing the standing time (h) in the standing step versus the charging time (sec) in the main charging step, according to an example of the invention.

FIG. 7 shows the relationship between the standing time (hours) in the standing step and the charging time (seconds) in the main charging step for each of the batteries in the reference example and the working example of the invention.

In batteries that were sealed at atmospheric pressure (reference example) without pressure reduction, even after 120 hours of standing in the standing step, charging up to the prescribed voltage in the main charging step took a long time. The reason is thought to be that uneven charging arose because main charging was carried out without fully discharging gases that resided within the electrode assembly (that is, at the surfaces of the electrodes and/or inside the electrode mixture layers). Such uneven charging may give rise to uneven resistance within the electrode assembly and thereby lower the battery characteristics, in fact, upon disassembling the batteries in the reference examples and checking the electrodes visually, color irregularities were confirmed in the electrodes. This is thought to be due to the tact that, because the electrodes were in prolonged contact with the retained gases, regions where the charging time was long and regions where the charging time was short (that is, uneven charging) arose.

On the other hand, in the batteries that were sealed in a pressure-reduced state (working example of the invention), the charging time in the main charging step decreased as the elapsed standing time in the standing step increased. At a standing time of at least 72 hours (more preferably, at least 96 hours), the charging time in the main charging step became substantially constant. For this reason, it appears that with standing for this length of time, the gas on the surfaces of the electrode and/or the gas within the electrode mixture layers was fully discharged outside of the electrode assembly. The above results confirm the significance of seating the interior of the hard case in a negatively pressurized state. Moreover, these results demonstrate that, under the conditions of these test examples, it is preferable to ensure a standing time which is sufficient for the period from the initial charging step to the main charging step (that is, the standing step), and that sealed lithium secondary batteries having a stable battery performance can be efficiently manufactured by such a manufacturing method.

Concrete embodiments of the invention have been described above in detail, although these serve merely to illustrate the invention and do not in any way limit the scope of the claims. Various changes and modifications to the foregoing embodiments are encompassed by the art as set forth in the claims.

INDUSTRIAL APPLICABILITY

The sealed lithium secondary battery disclosed herein is characterized by having a stable battery performance, and thus can be used in various applications. For example, the battery of the invention can be advantageously used as a power source which is used for driving a motor installed in a vehicle such as an automobile, and is required to have a high energy density and power density. The types of such vehicles are not particularly limited, although typical examples include plug-in hybrid vehicles (PHV), hybrid vehicles (HV) and electric vehicles (EV).

REFERENCE SIGNS LIST

1 Automobile (vehicle)
10 Positive electrode sheet (positive electrode)
12 Positive electrode current collector
14 Positive electrode mixture layer
20 Negative electrode sheet (negative electrode)
22 Negative electrode current collector
24 Negative electrode mixture layer
40A, 40B Separator Sheets
50 Hard case
52 Case body
54 Lid
55 Safety valve
70 Positive electrode terminal
72 Negative electrode terminal
80 Wound electrode assembly
90 Flat plate
100 Sealed lithium secondary battery
110 Cooling plate
120 End plate
130 Restraining band
140 Connecting member
150 Spacer member
155 Screw
200 Battery pack

The invention claimed is:

1. A method of manufacturing a sealed lithium secondary battery having an electrode assembly, an electrolyte solution and a sealable hard case, comprising:
   housing the electrode assembly, which includes a positive electrode and a negative electrode, and the electrolyte solution within the hard case;
   negatively pressurizing the interior of the hard case and sealing the hard case in the negatively pressurized state;
   carrying out, after the sealing step, initial charging so as to adjust the battery to a voltage at which the electrode assembly generates gases; and
   carrying out, after the initial charging step, main charging so as to charge the battery to a predetermined voltage, the hard case being maintained in a sealed state from the interval following the sealing step and UP until the main charging step so that the interior of the hard case is not open to the atmosphere.

2. The manufacturing method according to claim 1, further comprising the step of, after the initial charging step and before the main charging step, allowing the battery to stand until the gases generated by initial charging are substantially discharged from the electrode assembly.

3. The manufacturing method according to claim 2, wherein the standing step is carried out for at least 72 hours while holding the interior of the hard case after initial charging in a state that is not open to the atmosphere.

4. The manufacturing method according to claim 1, wherein the sealing step is carried out in a state where the pressure within the case is reduced below 60 kPa abs.

5. The manufacturing method according to claim 1, wherein the initial charging step charges the battery to a potential which is at least 1 V but does not exceed the predetermined voltage in the main charging step.

6. The manufacturing method according to claim 1, wherein the positive electrode has formed therein a positive electrode mixture layer containing, as a positive electrode active material, a lithium-transition metal complex oxide having a layered structure.

7. The manufacturing method according to claim 1, wherein the electrode assembly is a wound electrode assembly having a flattened shape, and the hard case having a rectangular shape that corresponds to the flattened shape is used.

8. The manufacturing method according to claim 1, wherein the electrolyte solution is a nonaqueous electrolyte solution containing at least one type of carbonate.

9. A sealed lithium secondary battery obtained by the manufacturing method according to claim 1.

10. A battery pack obtained by combining a plurality of sealed lithium secondary batteries according to claim 9.

11. A vehicle which is equipped with the battery pack according to claim 10 as a power source for driving the vehicle.

* * * * *